US009641914B2

United States Patent
Lee (10) Patent No.: US 9,641,914 B2
(45) Date of Patent: May 2, 2017

(54) REMOTE METER READING SYSTEM AND METHOD USING MULTIPLE MASTER DEVICES

(71) Applicant: LSIS CO., LTD., Anyang-si, Gyeonggi-do (KR)

(72) Inventor: Seong Joon Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 6 days.

(21) Appl. No.: 14/684,059

(22) Filed: Apr. 10, 2015

(65) Prior Publication Data
US 2015/0319512 A1  Nov. 5, 2015

(30) Foreign Application Priority Data

Apr. 30, 2014  (KR) .................. 10-2014-0052768

(51) Int. Cl.
*H04Q 9/00* (2006.01)
*H04B 3/54* (2006.01)

(52) U.S. Cl.
CPC ............... *H04Q 9/00* (2013.01); *H04B 3/546* (2013.01); *H04B 2203/5433* (2013.01); *H04B 2203/5479* (2013.01); *H04Q 2209/60* (2013.01)

(58) Field of Classification Search
CPC .... H04B 2203/5433; H04B 2203/5479; H04B 3/546; H04Q 2209/60; H04Q 9/00
See application file for complete search history.

(56) References Cited

U.S. PATENT DOCUMENTS

| | | | | |
|---|---|---|---|---|
| 2007/0147268 A1* | 6/2007 | Kelley | ............. | H04L 29/12216 370/254 |
| 2009/0256686 A1* | 10/2009 | Abbot | .................. | G01R 22/063 340/12.32 |
| 2012/0201146 A1 | 8/2012 | Shuey et al. | | |
| 2013/0251000 A1* | 9/2013 | Shuey | .................. | H04B 1/7156 375/134 |

FOREIGN PATENT DOCUMENTS

WO  2005/059572  6/2005

OTHER PUBLICATIONS

European Patent Office Application Serial No. 15165191.6, Search Report dated Aug. 5, 2015, 8 pages.

* cited by examiner

Primary Examiner — Sisay Yacob
(74) *Attorney, Agent, or Firm* — Lee Hong Degerman Kang & Waimey (57) ABSTRACT

This specification relates to a remote meter reading system using a plurality of master devices and a remote meter reading method thereof, and more particularly, a remote meter reading system using a plurality of master devices, capable of allowing for communication with another electricity meter modem which can replace one electricity meter modem when there is a trouble in communication between the one electricity meter modem and the master devices, allowing for fast and flexible reaction with respect to changes in communication network between the electricity meter modem and the master devices, and constructing a network path for communication with an optimal communication performance, all by way of enabling network connection and information sharing among master devices through communication between electricity meter modems and the plurality of master devices, and a remote meter reading method thereof.

7 Claims, 7 Drawing Sheets

REMOTE METER READING SYSTEM AND METHOD USING MULTIPLE MASTER DEVICES

CROSS-REFERENCE TO RELATED APPLICATIONS

Pursuant to 35 U.S.C. §119(a), this application claims the benefit of earlier filing date and right of priority to Korean Application No. 10-2014-0052768, filed on Apr. 30, 2014, the contents of which are all hereby incorporated by reference herein in its entirety.

BACKGROUND OF THE DISCLOSURE

1. Field of the Disclosure

This specification relates to a remote meter reading system and a remote meter reading method thereof, and more particularly, a remote meter reading system using a plurality of master devices, in which a master device for collecting meter reading data and constructing communication network is provided in plurality, such that electricity meter modems can perform remote meter reading through communication with the plurality of master devices, and a remote meter reading method thereof.

2. Background of the Disclosure

Figure 1:
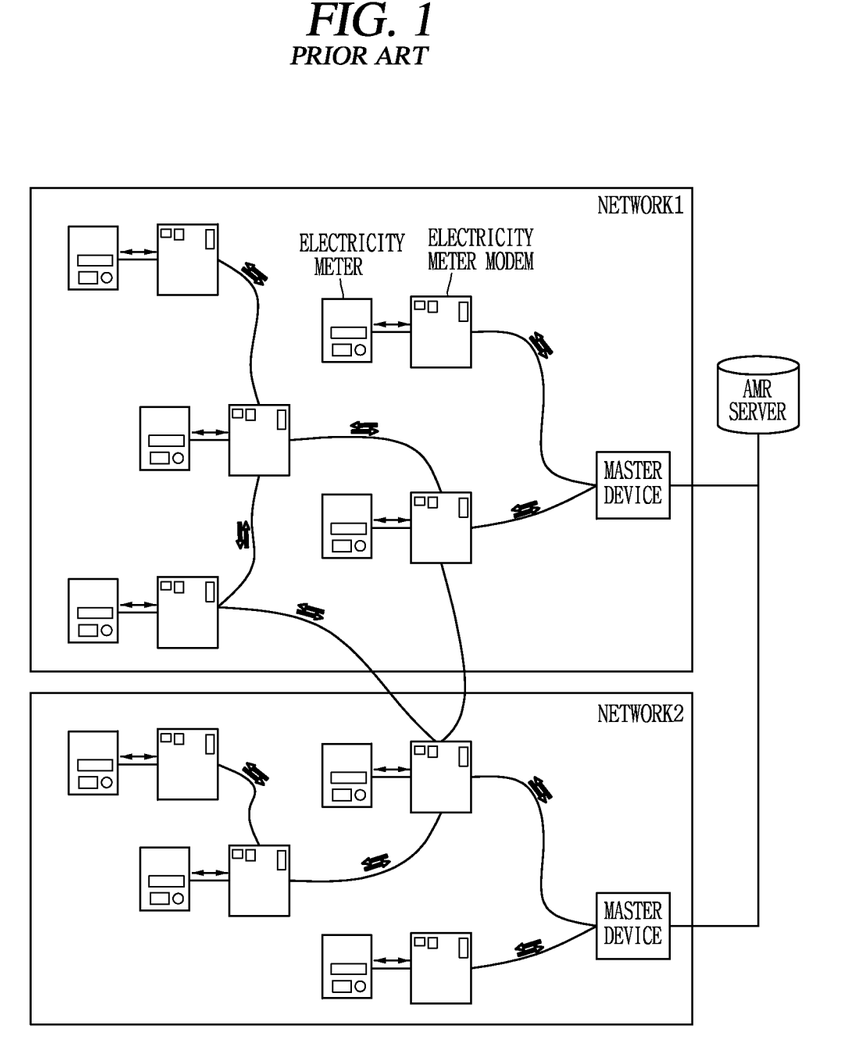
FIG. 1 is a conceptual view illustrating a configuration of a remote meter reading system according to the related art.

FIG. 1 is a conceptual view illustrating a configuration of a remote meter reading system according to the related art.

As illustrated in FIG. 1, the related art remote meter reading system has a master-slave structure in which each master device requests for meter reading data (electricity usage data) through direct communication with an electricity meter and the electricity meter transmits a response to the request. Each master device independently operates to obtain and manage only data obtained from electricity meters belonging to its network. Also, each electricity meter also processes and responds to only a request from one master.

If an electricity meter reading server (or an electricity metering server) and an electricity meter are in a bad communication state, data transmission and reception therebetween is enabled using multi-hop communication provided by a communication protocol. If response data has not been received after lapse of a predetermined time, the master device requests for retransmission of the response.

The conventional remote meter reading system adopts a method in which one master device communicates directly with a plurality of electricity meters. Here, if a communication condition between an electricity meter and the master device goes bad due to an external change, a communication success rate is lowered, thereby failing to read an electricity usage data. To compensate for this, reattempt is made upon a communication failure. However, once bad communication is caused, it is difficult to recover the communication state within a short term of time. Also, repetitive communication reattempts cause traffic within a limited network, and this may be likely to lower performance of the entire network.

Also, with regard to a physical communication line, in spite of actually enabling communication through another line, use of a line exhibiting bad performance causes usage efficiency of the entire network to be lowered.

SUMMARY OF THE DISCLOSURE

Therefore, to overcome the drawbacks of the related art, an aspect of the detailed description is to provide a remote meter reading system, capable of constructing an optimal network path by allowing for network connection and information sharing among a plurality of master devices, in a manner that electricity meter modems perform communication with the plurality of master devices, and a remote meter reading method thereof.

To achieve these and other advantages and in accordance with the purpose of this specification, as embodied and broadly described herein, there is provided a remote meter reading system using a plurality of master devices, the system including an electricity meter unit that is provided with a plurality of electricity meters each configured to read an amount of electricity energy, an electricity meter modem unit that is provided with a plurality of electricity meter modems each configured to obtain meter reading data from the electricity meter unit and to generate communication information, and a master device unit that is provided with a plurality of master devices each configured to collect the meter reading data and perform communication with the electricity meter modem unit based on the communication information, wherein the plurality of master devices construct a network path for communication with the electricity meter modem unit by mutually sharing the meter reading data and the communication information and perform communication with the electricity meter modem unit along the network path.

In one embodiment of the present disclosure, the communication information may include a communication condition and a communication performance of each of the plurality of electricity meter modems and communication availability of each of the plurality of electricity meter modems with adjacent one of the plurality of electricity meter modems.

In one embodiment of the present disclosure, each of the plurality of the electricity meter modems shares the meter reading data with the adjacent one of the plurality of electricity meter modems by periodically communicating with the adjacent one of the plurality of electricity meter modems.

In one embodiment of the present disclosure, each of the plurality of the electricity meter modems replaces the adjacent one of the plurality of electricity meter modems, so as to transmit the meter reading data to the plurality of master devices.

In one embodiment of the present disclosure, the master device unit construct the network path for the communication with the electricity meter modem unit on the basis of the sharing result of the communication information, and transmit path information related to the network path to the electricity meter modem unit, and wherein the electricity meter modem unit transmits the meter reading data to the master device unit on the basis of the path information.

In one embodiment of the present disclosure, the electricity meter modem unit measures a communication performance for the path information, and transmits the measurement result to the master device unit.

In one embodiment of the present disclosure, the master device unit update the path information by reconstructing the network path on the basis of the measurement result.

In one embodiment of the present disclosure, an electricity meter reading server that is connected to the master device unit and configured to control remote meter reading through the master device unit.

To achieve these and other advantages and in accordance with the purpose of this specification, as embodied and broadly described herein, there is provided a remote meter reading method using a plurality of master devices, the method including measuring, by at least one electricity meter modem performing communication for remote meter reading, a communication performance to generate communication information related to a communication state, transmitting by the electricity meter modem meter reading data obtained by reading an amount of electricity energy used and the communication information to at least one of the master devices, sharing the meter reading data and the communication information among the plurality of master devices, constructing by the plurality of master devices a network path for communication with the electricity meter modem, on the basis of the sharing result of the communication information, and performing by the plurality of master devices communication with the electricity meter modem along the network path.

In one embodiment of the present disclosure, in the generating of the communication information related to the communication state, each of the plurality of electricity meter modems may periodically perform communication with the adjacent one of the plurality of electricity meter modems to share the meter reading data with the adjacent one of the plurality of electricity meter modems. Accordingly, in the transmitting of the communication information to the at least one of the plurality of master devices, each of the plurality of the electricity meter modems may replace the adjacent one of the plurality of electricity meter modems so as to transmit the meter reading data to the plurality of master devices, instead of the adjacent one of the plurality of electricity meter modems.

In one embodiment of the present disclosure, the constructing of the network path for communication with the electricity meter modem unit may include transmitting by the master device unit path information related to the network path to the electricity meter modem unit.

In one embodiment of the present disclosure, the electricity meter modem unit may transmit the meter reading data to the master device unit on the basis of the path information.

In one embodiment of the present disclosure, the meter reading method may further include periodically measuring by the electricity meter modem unit a communication performance for the path information and transmitting the measurement result to the master device unit, and reconstructing by the master device unit the network path based on the measurement result so as to update the path information.

In one embodiment of the present disclosure, in the updating of the path information, when the network path is reconstructed, the master device unit may transmit the updated path information to the electricity meter modem unit, to repeat the communication with the electricity meter modem unit.

In the remote meter reading system using the plurality of master devices and the remote meter reading method thereof disclosed herein, the electricity meter modem unit may perform communication with the master device unit so as to allow for network connection and information sharing among the master device unit. This may enable one of the master devices to be replaced with another one of the master devices which is in a communication-available state when there is a trouble in communication between the electricity meter modem and a master device.

In the remote meter reading system using the plurality of master devices and the remote meter reading method thereof disclosed herein, the electricity meter modem unit may perform communication with the plurality of master devices so as to allow for network connection and information sharing among the plurality of master devices. This may enable fast and flexible reaction with respect to changes in a communication network between the electricity meter modem unit and the master device unit.

In the remote meter reading system using the plurality of master devices and the remote meter reading method thereof disclosed herein, network connection and information sharing among the plurality of the master devices can be allowed, thereby constructing a network path with the optimal communication performance.

In the remote meter reading system using the plurality of master devices and the remote meter reading method thereof disclosed herein, a network path with the optimal communication performance can be constructed to allow for communication, which may result in remote meter reading in a stable and efficient manner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

The invention described in this specification may be applied to a remote meter reading system and a remote meter reading method. However, the technology disclosed in this specification may not be limited to this, but also applicable to any of the conventional remote meter reading apparatuses, systems and methods, any of communication devices and systems for remote meter reading, and the like.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, description will be given of a remote meter reading system using a plurality of master device and a remote meter reading method thereof disclosed herein, with reference to FIGS. 2 and 3.

Figure 2:
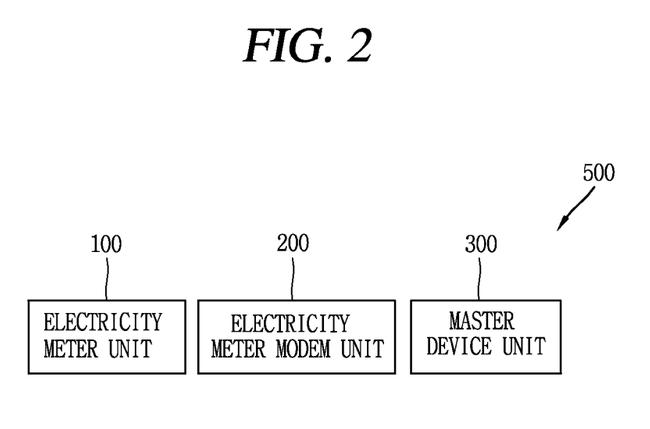
FIG. 2 is a view illustrating a configuration of a remote meter reading system using a plurality of master devices discloses herein.

FIG. 2 is a view illustrating a configuration of a remote meter reading system using a plurality of master devices in accordance with the present disclosure.

Figure 3:
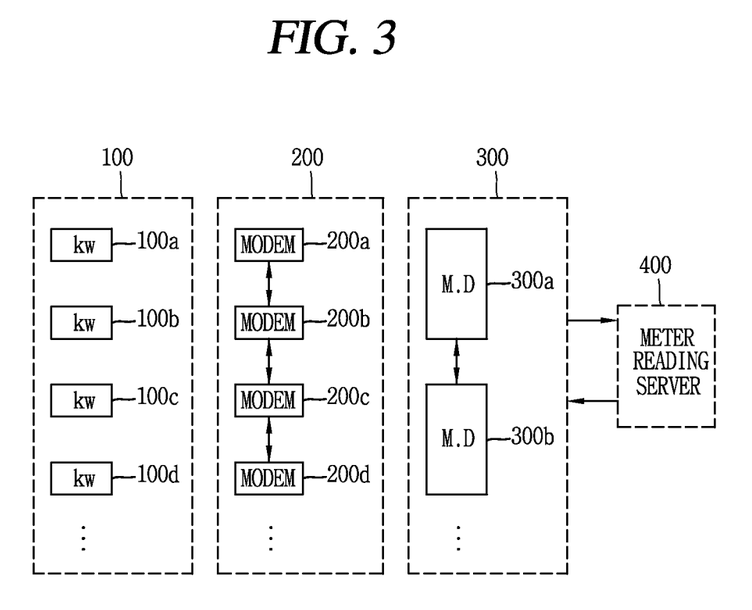
FIG. 3 is a view illustrating a configuration according to an embodiment of a remote meter reading system using a plurality of master devices disclosed herein.

FIG. 3 is a view illustrating a configuration according to an embodiment of a remote meter reading system using a plurality of master devices in accordance with an embodiment of the present disclosure.

As illustrated in FIG. 2, a remote electricity meter reading system 500 (hereinafter, referred to as an electricity meter reading system) using a plurality of master devices includes an electricity meter unit 100, an electricity meter modem unit 200, and a master device unit 300.

The electricity meter unit 100, the electricity meter modem unit 200 and the master device unit 300 constructing the electricity meter reading system 500, as illustrated in FIG. 3, may be provided with a plurality of electricity meters, electricity meter modems and master devices, respectively.

The electricity meter unit 100 may be a unit (or a set) including a plurality of electricity meters 100a, 100b, 100c, . . . .

Each electricity meter of the electricity meter unit 100 may be an apparatus which is provided in a consumer to read an amount of electricity energy used by the consumer.

The electricity meter may database the meter reading (metering) result of the amount of electricity energy used by the consumer.

The electricity meter unit 100 may be connected to the electricity meter modem unit 200.

Each of the plurality of electricity meters 100a, 100b, 100c, . . . of the electricity meter unit 100 may be connected to each of the plurality of electricity meter modems 200a, 200b, 200c, . . . of the electricity meter modem unit 200, respectively.

For example, an electricity meter 100a may be connected to an electricity meter modem 200a, an electricity meter 100b to an electricity meter modem 200b, and an electricity meter 100c to an electricity meter modem 200c, in a one-to-one manner.

At least one of the plurality of electricity meters 100a, 100b, 100c, . . . of the electricity meter unit 100 may also be connected to at least one of the plurality of electricity meter modems 200a, 200b, 200c, . . . of the electricity meter modem unit 200.

For example, the electricity meter 100a and the electricity meter 100b may be connected to at least one of the electricity meter modem 200a and the electricity meter modem 200b, in a many-to-many manner.

The electricity meter unit 100 may read the amount of electricity energy used by the consumer, database the meter reading result, and transfer the databased meter reading data to the electricity meter modem unit 200.

The electricity meter unit 100 may receive a request signal for the meter reading data from the electricity meter modem unit 200, and accordingly transfer the meter reading data to the electricity meter modem unit 200.

The electricity meter modem unit 200 may be a unit (or a set) including a plurality of electricity meter modems 200a, 200b, 200c, . . . .

Each of the plurality of electricity meter modems 200a, 200b, 200c, . . . may be connected to at least one of the plurality of electricity meters 100a, 100b, 100c, . . . .

That is, one of the plurality of electricity meter modems 200a, 200b, 200c, . . . of the electricity meter modem unit 200 may be connected with at least one of the plurality of electricity meters 100a, 100b, 100c, . . . of the electricity meter unit 100 to receive the meter reading data from the at least one of the plurality of electricity meters 100a, 100b, 100c, . . . of the electricity meter unit 100.

The electricity meter modem unit 200 may be a communication device which enables communication with a plurality of master devices 300a, 300b, . . . of the master device unit 300.

The electricity meter modem unit 200 may also be a communication module which enables communication with the plurality of master devices 300a, 300b, . . . of the master device unit 300.

The electricity meter modem unit 200 may also be a communication module which is included in the electricity meter unit 100 to perform communication with the plurality of master devices 300a, 300b, . . . of the master device unit 300.

The electricity meter modem unit 200 may perform communication with the master device unit 300 in a wired or wireless manner.

Each of the plurality of electricity meter modems 200a, 200b, 200c, . . . of the electricity meter modem unit 200 may perform communication with at least one of the master devices 300a, 300b, ... of the master device unit 300.

For example, the plurality of electricity meter modems 200a, 200b, 200c, ... of the electricity meter modem unit 200 can perform communication with the plurality of master devices 300a, 300b, ... of the master device unit 300 in a many-to-many manner, such as the electricity meter modem 200a performing communication with the master devices 300a and 300b, and the electricity meter modem 200b performing communication with the master devices 300a and 300b.

The electricity meter modem unit 200 may receive the meter reading data from the electricity meter unit 100, and transmit the received meter reading data to the master device unit 300.

The electricity meter modem unit 200 may transmit the meter reading data to each of the at least one of the plurality of master devices 300a, 300b, ... of the master device unit 300.

The electricity meter modem unit 200 may transmit the meter reading data to at least one of the plurality of master devices 300a, 300b, ... , which is under a communication-available state.

The electricity meter modem unit 200 may transmit the meter reading data to each of the at least one master device 300a, 300b, ... , which is located adjacent thereto, among the plurality of master devices 300a, 300b, ... of the master device unit 300.

The master device unit 300 may be a unit (or a set) including a plurality of master devices 300a and 300b.

The master device unit 300 may perform communication with at least one of the electricity meter modem 200a, 200b, 200c, ... of the electricity meter modem unit 200.

Each of the plurality of master devices 300a, 300b, ... of the master device unit 300 may perform communication with at least one of the electricity meter modem 200a, 200b, 200c, ... of the electricity meter modem unit 200.

The master device unit 300 may be a data concentration unit which stores the meter reading data received from the electricity meter modem unit 200 and can perform communication with the electricity meter modem unit 200.

The master device unit 300 may request the electricity meter modem unit 200 to transmit the meter reading data thereto, and receive the meter reading data from the electricity meter modem unit 200.

That is, when the master device unit 300 requests for the transmission of the meter reading data from the electricity meter modem unit 200, the electricity meter modem unit 200 may transmit the meter reading data received from the electricity meter 100 to the master device unit 300.

The electricity meter unit 100 is configured to read metering data.

The electricity meter modem unit 200 transmits the meter reading data obtained from the electricity meter unit 100 and communication information relating to a communication state to at least one of the plurality of master devices 300a, 300b, ... of the master device unit 300.

The electricity meter modem unit 200 may be configured to measure a communication performance.

The electricity meter modem unit 200 may measure the communication performance among the plurality of electricity meter modems 200a, 200b, 200c, ... , and the communication performance with the master device unit 300.

The communication information may include a communication condition of an electricity meter modem, a communication performance of the electricity meter modem, and information related to availability of communication with another electricity meter modem adjacent to the electricity meter modem.

Each of the plurality of electricity meter modems 200a, 200b, 200c, ... may perform communication with adjacent one of the plurality of electricity meter modems 200a, 200b, 200c, ... in a periodical manner, so as to share the meter reading data with the adjacent one of the plurality of electricity meter modems 200a, 200b, 200c, ... .

For example, when the electricity meter modem 200a is located adjacent to the electricity meter modem 200c and the electricity meter modem 200d, the electricity meter modem 200a may periodically perform communication with the electricity meter modem 200c and the electricity meter modem 200d, so as to share the meter reading data with the electricity meter modem 200c and the electricity meter modem 200d.

Each of the plurality of electricity meter modems 200a, 200b, 200c, ... may perform the periodical communication with the adjacent one of the plurality of electricity meter modems 200a, 200b, 200c, ... , to recognize communication states with the adjacent one of the plurality of electricity meter modems 200a, 200b, 200c, ... .

Each of the plurality of electricity meter modems 200a, 200b, 200c, ... may be configured to replace the adjacent one of the plurality of electricity meter modems 200a, 200b, 200c, ... , to transmit the meter reading data to the plurality of master device unit 300, instead of the adjacent one of the plurality of electricity meter modems 200a, 200b, 200c, ... .

For example, in case where the electricity meter modem 200a shares the meter reading data with the electricity meter modem 200c and the electricity meter modem 200d, when the electricity meter modem 200c and the electricity meter modem 200d are unable to perform communication with the master device unit 300 due to an error (or a fault) generated in the electricity meter modem 200c and the electricity meter modem 200d, the electricity meter modem 200a may replace the electricity meter modem 200c and the electricity meter modem 200d, and transmit the meter reading data, which it has shared with the electricity meter modem 200c and the electricity meter modem 200d, to the master device unit 300, instead of the electricity meter modems 200c and 200d.

That is, each of the plurality of electricity meter modems 200a, 200b, 200c, ... of the electricity meter modem unit 200 may recognize the mutual communication states and share the meter reading data. Accordingly, when one electricity meter modem is unable to perform communication with the master device unit 300, another electricity meter modem may replace the communication-unavailable electricity meter modem so as to maintain the communication state with the master device unit 300.

The plurality of master devices 300a, 300b, ... of the master device unit 300 may collect the meter reading data and perform communication with the electricity meter modem unit 200 based on the communication information.

The plurality of master devices 300a, 300b, ... of the master device unit 300 may collect the meter reading data transmitted from the electricity meter modem unit 200, and store the collected meter reading data in their internal storage units, respectively.

The plurality of master devices 300a, 300b, ... of the master device unit 300 may perform remote meter reading, in a manner of requesting for transmission of the meter reading data from the electricity meter modem unit 200, and collecting the meter reading data transmitted from electricity meter modem unit 200.

The plurality of master devices 300a, 300b, . . . of the master device unit 300 may receive the communication information from the electricity meter modem unit 200, to recognize the communication states with the electricity meter modem unit 200.

The plurality of master devices 300a, 300b, . . . of the master device unit 300 may mutually share the meter reading data and the communication states to construct a network path for the communication with the electricity meter modem unit 200, and thus perform communication with the electricity meter modem unit 200 along the network path.

That is, the plurality of master devices 300a, 300b, . . . of the master device unit 300 may share the communication information transmitted from each of the plurality of electricity meter modems 200a, 200b, 200c, . . . of the electricity meter modem unit 200 to recognize the communication states of each of the plurality of electricity meter modems 200a, 200b, 200c, . . . of the electricity meter modem unit 200 and communication paths for the communication with the electricity meter modem unit 200, thereby constructing the network path for communicating with the electricity meter modem unit 200 with the optimal communication performance.

For example, when the master device 300a and the master device 300b share communication information a and communication information b with each other, which results from that the electricity meter modem 200a transmits the communication information a to the master device 300a and the master device 300b communicating therewith and the electricity meter modem 200b transmits the communication information b to the master device 300a and the master device 300b communicating therewith, the communication information a and the communication information b transmitted to each of the master device 300a and the master device 300b may be compared, for example, reception state, reception distance, reception time and the like of the communication information may be compared with each other. According to the comparison result, the electricity meter modem 200a and the electricity meter modem 200b may determine with which one of the master devices 300a and 300b is advantageous to communicate. Consequently, the network path for performing communication with the optimal communication performance can be constructed according to the determination result.

The process of constructing the network path will be described in more detail. When the master device 300a shows a better reception state for the communication information a than the communication information b and the master device 300b shows a better reception state for the communication information b than the communication information a, the electricity meter modem 200a which has transmitted the communication information a may determine that it is advantageous to communicate with the master device 300a. Also, the electricity meter modem 200b which has transmitted the communication information b determines that it is advantageous to communicate with the master device 300b. Accordingly, the network path can be constructed such that the electricity meter modem 200a performs communication with the master device 300a and the electricity meter modem 200b performs communication with the master device 300b.

The plurality of master devices 300a, 300b, . . . of the master device unit 300 may construct the network path for the communication with the electricity meter modem unit 200 based on the sharing result of the communication information. Accordingly, The plurality of master devices 300a, 300b, . . . of the master device unit 300 may transmit path information relating to the network path to the electricity meter modem unit 200, and the electricity meter modem unit 200 may transmit the meter reading data to The plurality of master devices 300a, 300b, . . . of the master device unit 300 based on the path information.

That is, The plurality of master devices 300a, 300b, . . . of the master device unit 300 may construct the network path and transmit the path information relating to the network path to the electricity meter modem 200 such that the electricity meter modem unit 200 can perform communication therewith along the network path. The electricity meter modem unit 200 may thus perform communication with The plurality of master devices 300a, 300b, . . . of the master device unit 300 based on the path information.

For example, the electricity meter modem 200a may transmit the communication information to the master device 300a and the master device 300b. The master device 300a and the master device 300b may share the transmitted communication information with each other. It may be determined according to the sharing result of the communication information that the electricity meter modem 200a is advantageous to communicate with the master device 300b. Accordingly, when the network path is set such that the electricity meter modem 200a preferentially performs communication with the master device 300b and then performs communication with the master device 300b as the second best, the master device 300b may transmit the path information relating to the network path to the electricity meter modem 200a. The electricity meter modem unit 200a may then transmit the meter reading data to the master device 300b based on the path information. When the communication with the master device 300b is disabled, the electricity meter modem 200a may then transmit the meter reading data to the master device 300a as the second best.

The electricity meter modem unit 200 may measure communication performance for the path information in a periodical manner, and transmit the measurement results to the plurality of master devices 300a, 300b, . . . of the master device unit 300.

That is, the communication performance for the path information may be periodically measured to recognize changes in the communication performance for the path information and the measurement result may thusly be transmitted to the plurality of master devices 300a, 300b, . . . of the master device unit 300, such that the changed communication performance can be reflected to the network path.

The plurality of master devices 300a, 300b, . . . of the master device unit 300 may reconstruct the network path based on the measurement result, and update the path information.

The plurality of master devices 300a, 300b, . . . of the master device unit 300 may retransmit the path information which has been updated with the changed communication performance to the electricity meter modem unit 200. Accordingly, the electricity meter modem unit 200 can transmit the meter reading data to the plurality of master devices 300a, 300b, . . . of the master device unit 300 based on the updated path information.

The electricity meter reading system 500 may further include an electricity meter reading server 400 which is connected to the plurality of master devices 300a, 300b, . . . of the master device unit 300 and controls the remote meter reading through the plurality of master devices 300a, 300b, . . . of the master device unit 300.

The meter reading server 400 may be a central server which controls the remote meter reading of the electricity meter reading system 500.

The meter reading server 400 may receive the meter reading data, the communication information and the path information from the master device unit 300 for storage.

The meter reading server 400 may control the remote meter reading through the plurality of master devices 300a, 300b, . . . of the master device unit 300 on the basis of the communication information and the path information transmitted from the plurality of master devices 300a, 300b, . . . of the master device unit 300.

Hereinafter, description will be given of a remote meter reading method (hereinafter, referred to as meter reading method) using a plurality of master devices disclosed herein, with reference to FIGS. 4 and 5.

Figure 4:
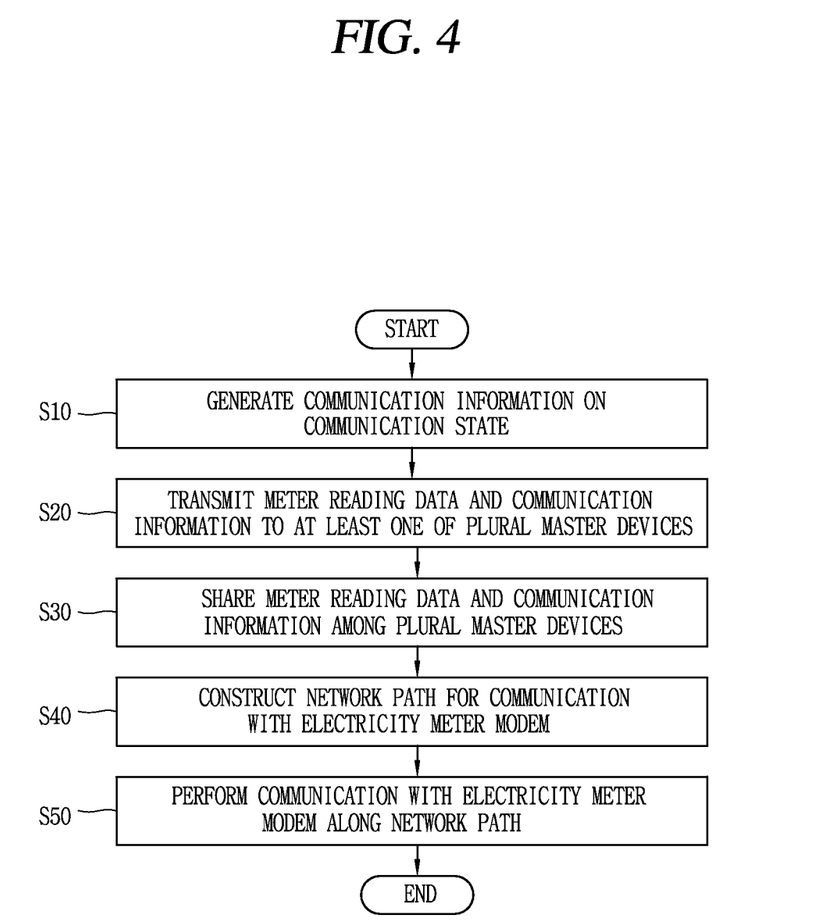
FIG. 4 is a flowchart illustrating sequential steps of a remote meter reading method using a plurality of master devices disclosed herein.

FIG. 4 is a flowchart illustrating sequential steps of a remote meter reading method using a plurality of master devices in accordance with the present disclosure.

Figure 5:
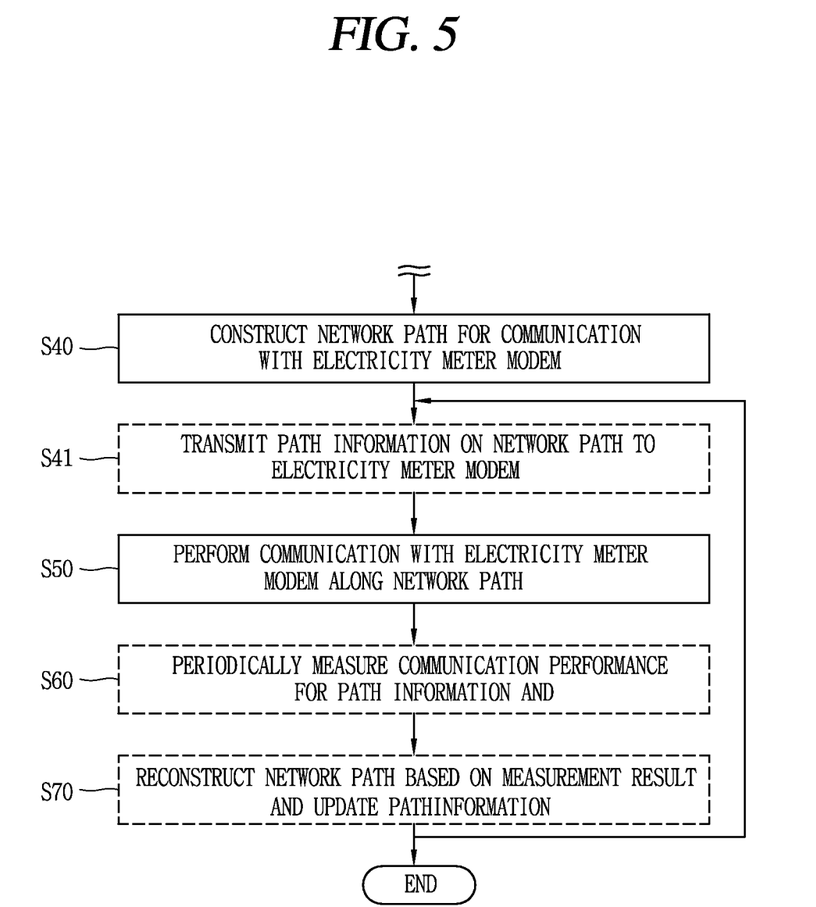
FIG. 5 is a flowchart illustrating additional steps according to an embodiment of a remote meter reading method using a plurality of master devices disclosed herein.

FIG. 5 is a flowchart illustrating additional steps according to an embodiment of a remote meter reading method using a plurality of master devices disclosed herein.

The meter reading method, as illustrated in FIG. 4, includes measuring, by at least one electricity meter modem performing communication for remote meter reading, a communication performance to generate communication information related to a communication state (S10), transmitting by the electricity meter modem meter reading data obtained by reading an amount of electricity energy used and the communication information to at least one of a plurality of master devices (S20), sharing the meter reading data and the communication information among the plurality of master devices (S30), constructing by the plurality of master devices a network path for communication with the electricity meter modem, on the basis of the sharing result of the communication information (S40), and performing by the plurality of master devices communication with the electricity meter modem along the network path (S50).

The electricity meter modem and the master device may be provided in plurality.

The plurality of electricity meter modems may be connected to at least one electricity meter.

The electricity meter modem may perform communication with the plurality of master devices in a wired or wireless manner.

Each of the plurality of electricity meter modems may perform communication with at least one of the plurality of master devices.

In the generating of the communication information related to the communication state (S10), the electricity meter modem may measure the communication performance with other electricity meter modems and the communication performance with the plurality of master devices.

The communication information may include a communication condition of the electricity meter modem, a communication performance of the electricity meter modem, and information related to availability of communication with other electricity meter modems adjacent to the electricity meter modem.

In the generating of the communication information related to the communication state (S10), the electricity meter modem may periodically perform communication with the adjacent electricity meter modems, and share the meter reading data with the adjacent electricity meter modems.

In the generating of the communication information related to the communication state (S10), the electricity meter modem may periodically perform communication with the adjacent electricity meter modems, to recognize the communication state of the adjacent electricity meter modems.

Meanwhile, the electricity meter modem may replace another electricity meter modem.

In the generating of the communication information related to the communication state (S10), the electricity meter modem may periodically perform communication with the adjacent electricity meter modems to share the meter reading data with the adjacent electricity meter modems. Accordingly, in the transmitting of the communication information to the at least one of the plurality of master devices (S20), the electricity meter modem may replace the adjacent electricity meter modems so as to transmit the meter reading data to the plurality of master devices, instead of the adjacent electricity meter modems.

That is, the electricity meter modems may recognize the mutual communication states and share the meter reading data. When one electricity meter modem is unable to communicate with the plurality of master devices, another electricity meter modem may replace the communication-unavailable electricity meter modem such that the communication state with the plurality of master devices can be maintained.

In the transmitting of the meter reading data and the communication information to the at least one of the plurality of master devices (S20), the electricity meter modem may receive the meter reading data from the electricity meter, and transmit the received meter reading data to the plurality of master devices.

In the transmitting of the meter reading data and the communication information to the at least one of the plurality of master devices (S20), the electricity meter modem may transmit the meter reading data to the at least one of the plurality of master devices, respectively.

In the transmitting of the meter reading data and the communication information to the at least one of the plurality of master devices (S20), the electricity meter modem may transmit the meter reading data to at least one of the plurality of master devices in a communication-available state.

In the transmitting of the meter reading data and the communication information to the at least one of the plurality of master devices (S20), the electricity meter modem may transmit the meter reading data to at least one of the plurality of master devices, located adjacent thereto.

The plurality of master devices may indicate a plurality of master devices included in a master device unit.

Each of the plurality of master devices may perform communication with at least one of the electricity meter modems.

Each of the plurality of master devices may be a data concentration unit which stores the meter reading data received from the electricity meter modem and can perform communication with the electricity meter modem.

The plurality of master devices may request for the transmission of the meter reading data from the electricity meter modems, and receive the meter reading data from the electricity meter modems.

The plurality of master devices may collect the meter reading data and perform communication with the electricity meter modems on the basis of the communication information.

The plurality of master devices may collect the meter reading data transmitted from the electricity meter modems, and store the collected meter reading data in internal storage units thereof, respectively.

In the sharing of the meter reading data and the communication information among the plurality of master devices (S30), the plurality of master devices may receive the communication information from the electricity meter modem, and recognize the communication states of the electricity meter modem on the basis of the received communication information.

In the constructing of the network path for the communication with the electricity meter modem (S40), the plurality of master devices may construct the network path for the communication with the electricity meter modem by mutually sharing the meter reading data and the communication information.

That is, the plurality of master devices may mutually share the communication information transmitted from the respective electricity meter modems to determine communication states of the electricity meter modems and overall communication paths for communication with the respective electricity meter modems, thereby constructing the network path for communication with the optimal performance with the respective electricity meter modems.

The constructing of the network path for communication with the electricity meter modem (S40), as illustrated in FIG. 5, may include transmitting by the plurality of master devices path information related to the network path to the electricity meter modem (S41).

In the transmitting of the path information on the network path to the electricity meter modem (S41), the plurality of master devices may construct the network path for the communication with the electricity meter modem on the basis of the sharing result of the communication information and then transmit the path information on the network path to the electricity meter modem. In the performing of the communication with the electricity meter modem along the network path (S50), the electricity meter modem may transmit the meter reading data to the plurality of master devices on the basis of the path information.

That is, the plurality of master devices which have constructed the network path may transmit the path information to the electricity meter modems such that the electricity meter modems can communicate therewith along the network path. Then, the electricity meter modems can communicate with the plurality of master devices on the basis of the path information.

The meter reading method may further include periodically measuring by the electricity meter modem a communication performance for the path information and transmitting the measurement result to the plurality of master devices (S60), and reconstructing by the plurality of master devices the network path based on the measurement result so as to update the path information (S70).

In the transmitting of the measurement result to the plurality of master device (S60), the electricity meter modem may measure the communication performance for the path information and transmit the measurement result to the plurality of master devices.

In the transmitting of the measurement result to the plurality of master device (S60), the communication performance for the path information may be periodically measured to recognize changes in the communication performance for the path information and the measurement result may be transmitted to the plurality of master devices.

Accordingly, the updated communication performance can be reflected to the network path.

In the updating of the path information (S70), the plurality of master devices may update the path information by reconstructing the network path based on the measurement result.

In the updating of the path information (S70), the plurality of master devices may retransmit the path information, which has been updated with the changed communication performance, to the electricity meter modems. Accordingly, the electricity meter modems can transmit the meter reading data to the plurality of master devices according to the path information.

The remote meter reading system to which the meter reading method can be applied may further include an electricity meter reading server which is connected to the plurality of master devices and controls the remote meter reading through the plurality of master devices.

The meter reading server may be a central server which controls the remote meter reading of the electricity meter reading system.

The meter reading server may receive the meter reading data, the communication information and the path information from the plurality of master devices for storage.

The meter reading server may control the remote meter reading through the plurality of base devices on the basis of the communication information and the path information transmitted from the plurality of master devices.

Hereinafter, description will be given of a representative example of a remote meter reading process according to an embodiment of a remote meter reading system using a plurality of master devices and a remote meter reading method thereof disclosed herein, with reference to the embodiments of the electricity meter reading system 500 and the meter reading method and FIGS. 6 to 8.

Figure 6:
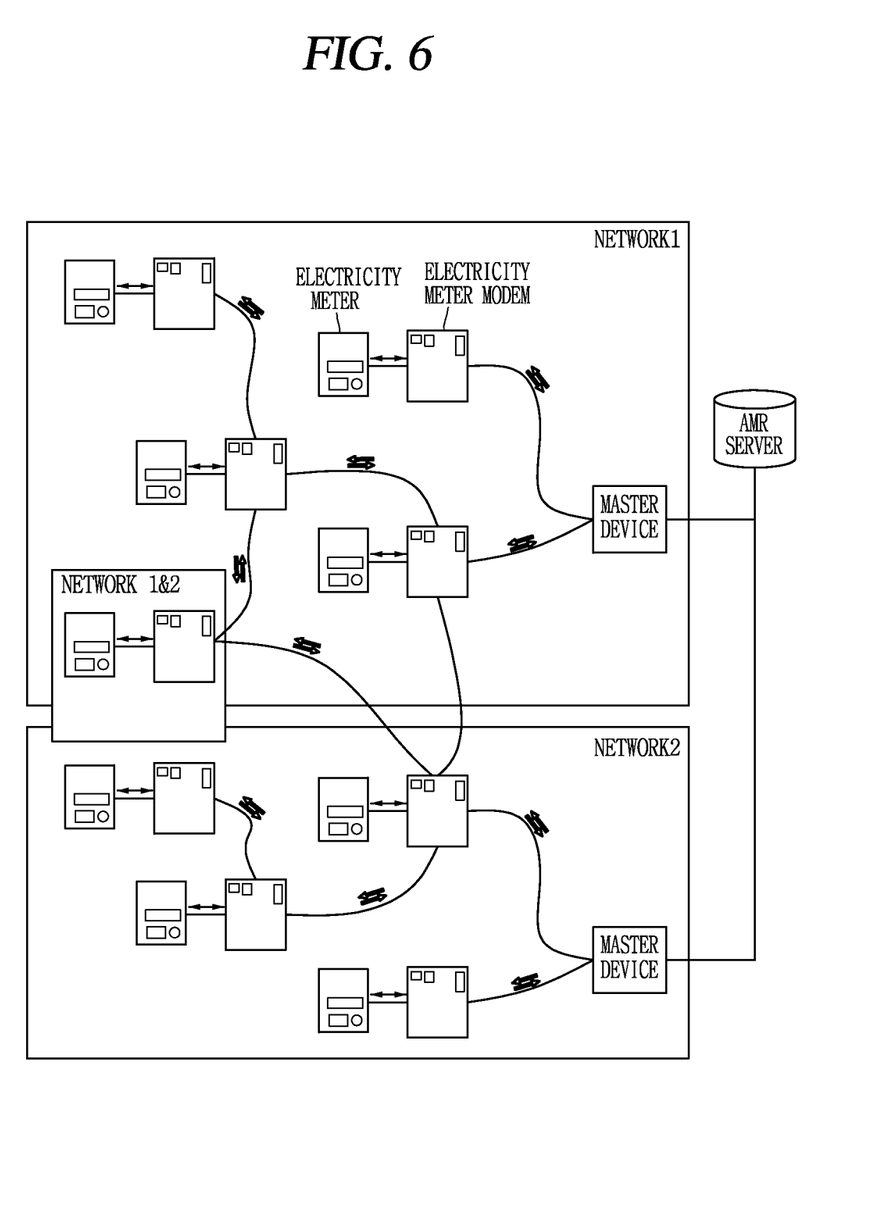
FIG. 6 is a conceptual view illustrating a configuration according to an embodiment a remote meter reading system a plurality of master devices and a remote meter reading method thereof disclosed herein.

FIG. 6 is a conceptual view illustrating a configuration according to an embodiment of a remote meter reading system using a plurality of master devices and a remote meter reading method thereof disclosed herein.

Figure 7:
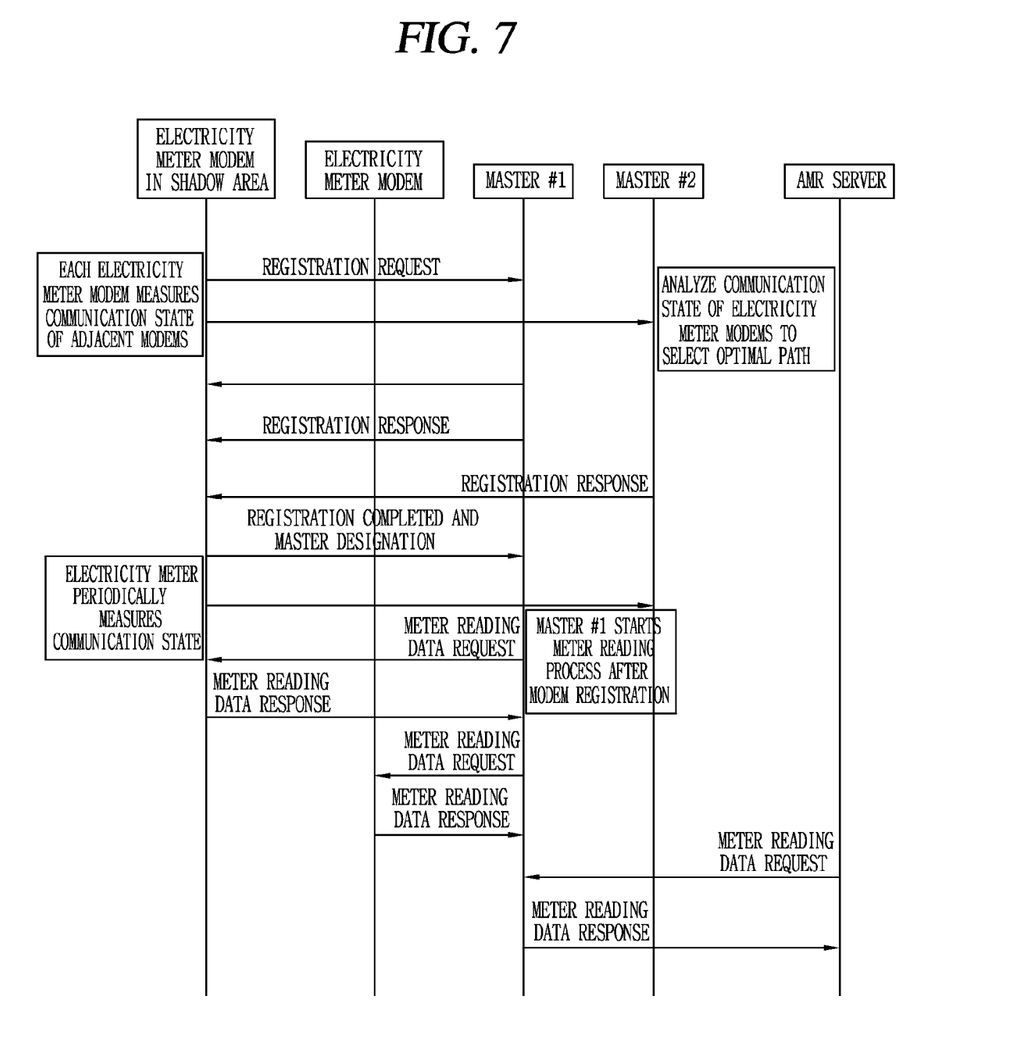
FIG. 7 is a conceptual view illustrating a remote meter reading process according to an embodiment of a remote meter reading system using a plurality of master devices and a remote meter reading method thereof disclosed herein.

FIG. 7 is a conceptual view illustrating a remote meter reading process according to an embodiment of a remote meter reading system using a plurality of master devices and a remote meter reading method thereof disclosed herein.

Figure 8:
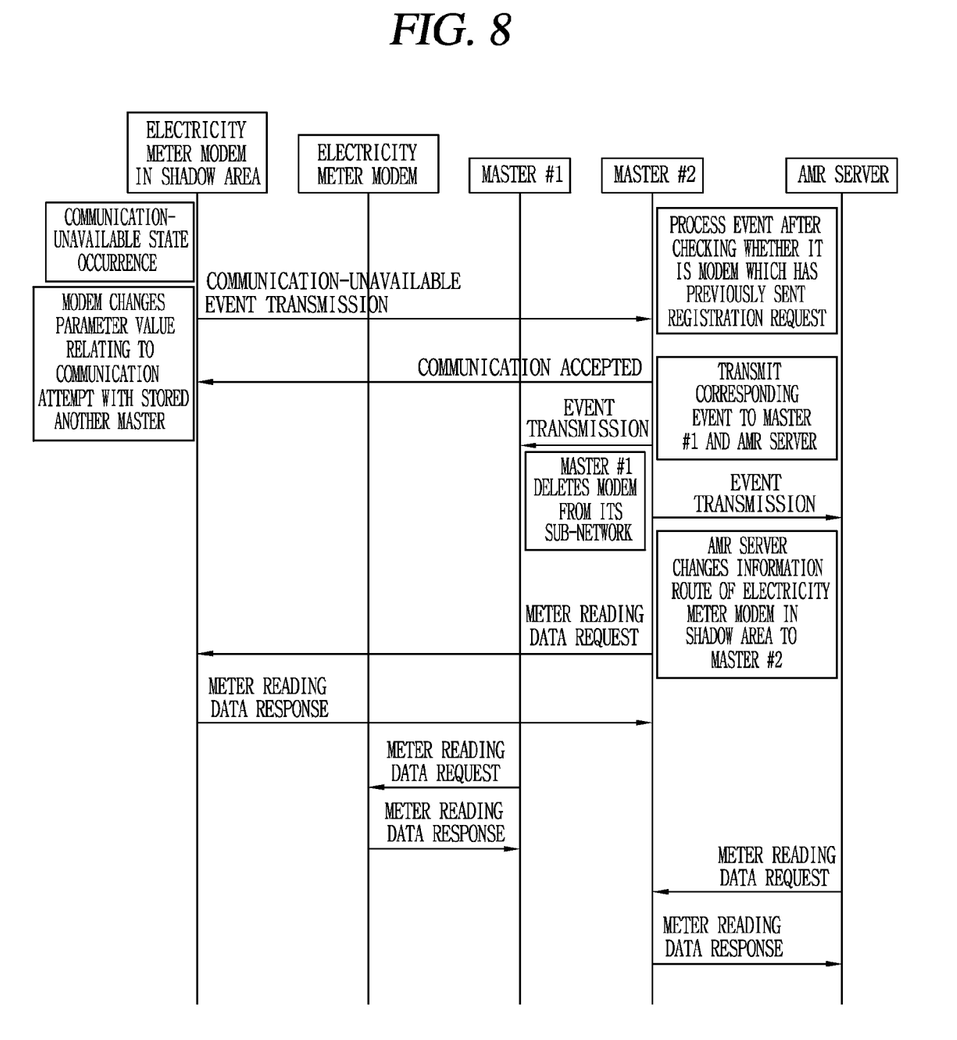
FIG. 8 is another conceptual view illustrating a remote meter reading process according to an embodiment of a remote meter reading system using a plurality of master devices and a remote meter reading method disclosed herein.

FIG. 8 is another conceptual view illustrating a remote meter reading process according to an embodiment of a remote meter reading system using a plurality of master devices and a remote meter reading method disclosed herein.

The electricity meter reading system 500, as illustrated in FIG. 6, may be implemented into an embodiment, which includes electricity meters, electricity meter modems and master devices, and further include an electricity meter reading server to perform and control remote meter reading of the electricity meter reading system 500.

The electricity meter reading system 500 may execute the remote meter reading by an electricity meter reading method. The meter reading method may include measuring, by the at least one electricity meter modem performing communication for remote meter reading, a communication performance to generate communication information related to a communication state (S10), transmitting by the electricity meter modem meter reading data obtained by reading an amount of electricity energy used and the communication information to at least one of the master devices (S20), sharing the meter reading data and the communication information among the plurality of master devices (S30), constructing by the plurality of master devices a network path for communication with the electricity meter modem, on the basis of the sharing result of the communication information (S40), and performing by the plurality of master devices communication with the electricity meter modem along the network path (S50).

As illustrated in the process of FIG. 7, the electricity meter modems may collect network information on surroundings thereof and communication state information relating to adjacent electricity meter modems thereto, and transmit the collected network information and the communication state information to the plurality of master devices (#1 and #2).

The electricity meter modem may allow the plurality of master devices to receive the meter reading data and the communication information through broadcasting.

The plurality of master devices which have received the communication information may set the most advantageous communication path with the electricity meter modem on the basis of the communication information, and then transmit the path information, which further includes a communication performance and a performance-checking period, to the electricity meter modem.

The electricity meter modem which has received the path information from the plurality of master devices may store the path information, and designate a master device (e.g., #1) with the best communication performance, among the plurality of master devices, as a primary communication target, so as to start to communicate with the designated master device.

Afterwards, the electricity meter modem may check whether or not it is possible to communicate with the plurality of master devices at each performance-checking period, which has been included in the path information transmitted from the plurality of master devices.

As illustrated in FIG. 8, when there is a trouble in communication performance with the plurality of master devices, the electricity meter modem may change the communication target to another master device (e.g., #2), instead of the previously-communicated master device (e.g., #1).

The electricity meter modem unit 200 which has changed the communication target may transmit the corresponding event to the newly-changed master device (#2) of the plurality of master devices. The newly-changed master device may decide whether to allow the corresponding electricity meter modem to take part in its network or select another master device, taking into account its sub-network condition.

When the new master device decides the participation of the electricity meter modem into its network, the master device may transfer the corresponding event to the electricity meter modem. The new master device may also transmit the corresponding event to the previous master device such that the previous master device can delete the electricity meter modem from its network.

Also, the new master device may also notify the corresponding event to the meter reading server as the high server, such that the meter reading server can request for the meter reading data of the corresponding electricity meter modem of the electricity meter modems 200 from the new master device, other than the previous master device.

The embodiments of the remote meter reading system using the plurality of master devices and the remote meter reading method thereof disclosed herein may be applied to remote meter reading apparatuses, remote meter reading systems and remote meter reading methods.

The embodiments of the remote meter reading system using the plurality of master devices and the remote meter reading method thereof disclosed herein may be applied to communication devices, systems and methods for remote meter reading.

In the remote meter reading system using the plurality of master devices and the remote meter reading method thereof disclosed herein, the electricity meter modems may perform communication with the plurality of master devices so as to allow for network connection and information sharing among the plurality of master devices. This may enable an electricity meter modem to be replaced with another master device which is in a communication-available state when there is a trouble in communication between the electricity meter modem and a master device.

In the remote meter reading system using the plurality of master devices and the remote meter reading method thereof disclosed herein, the electricity meter modems may perform communication with the plurality of master devices so as to allow for network connection and information sharing among the plurality of master devices. This may enable fast and flexible reaction with respect to changes in a communication network between the electricity meter modem and the master device.

In the remote meter reading system using the plurality of master devices and the remote meter reading method thereof disclosed herein, network connection and information sharing among the master devices can be allowed, thereby constructing a network path with the optimal communication performance.

In the remote meter reading system using the plurality of master devices and the remote meter reading method thereof disclosed herein, a network path with the optimal communication performance can be constructed to allow for communication, which may result in remote meter reading in a stable and efficient manner.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A remote meter reading system using a plurality of master devices comprising:
    an electricity meter unit that is provided with a plurality of electricity meters each configured to read an amount of electricity energy;
    an electricity meter modem unit that is provided with a plurality of electricity meter modems each configured to obtain meter reading data from the electricity meter unit and to generate communication information; and
    a master device unit that is provided with a plurality of master devices each configured to collect the meter reading data and perform communication with the electricity meter modem unit based on the communication information, wherein the plurality of master devices construct a network path for communication with the electricity meter modem unit by mutually sharing the meter reading data and the communication information and perform communication with the electricity meter modem unit along the network path,
    wherein at least one of the plurality of electricity meters of the electricity meter unit are connected to at least one of the plurality of electricity meter modems of the electricity meter modem unit, wherein at least one of the plurality of electricity meter modems of the electricity meter modem unit performs communication with at least one of the master devices of the master device unit, wherein the communication information comprises a communication condition and a communication performance of each of the plurality of electricity meter modems and communication availability of each of the plurality of electricity meter modems with an adjacent one of the plurality of electricity meter modems.

2. The system of claim 1, wherein each of the plurality of the electricity meter modems shares the meter reading data with the adjacent one of the plurality of electricity meter modems by periodically communicating with the adjacent one of the plurality of electricity meter modems.

3. The system of claim 2, wherein each of the plurality of the electricity meter modems replaces the adjacent one of the plurality of electricity meter modems so as to transmit the meter reading data to the plurality of master devices.

4. The system of claim 1, wherein the master device unit construct the network path for the communication with the electricity meter modem unit on the basis of the sharing result of the communication information, and transmit path information related to the network path to the electricity meter modem unit, and wherein the electricity meter modem unit transmits the meter reading data to the master device unit on the basis of the path information.

5. The system of claim 4, wherein the electricity meter modem unit measures a communication performance for the path information, and transmits the measurement result to the master device unit.

6. The system of claim 5, wherein the master device unit update the path information by reconstructing the network path on the basis of the measurement result.

7. The system of claim 1, further comprising:

an electricity meter reading server that is connected to the master device unit and configured to control remote meter reading through the master device unit.

\* \* \* \* \*